(12) United States Patent
Napier-Clark

(10) Patent No.: US 7,340,238 B2
(45) Date of Patent: Mar. 4, 2008

(54) PERSONAL COMMUNICATIONS AND COSMETICS APPARATUS

(75) Inventor: Judith Anne Napier-Clark, Hampshire (GB)

(73) Assignee: Mobile Make-Up Limited, Winchester, Hampshire (GB)

( * ) Notice: Subject to any disclaimer, the term of this patent is extended or adjusted under 35 U.S.C. 154(b) by 9 days.

(21) Appl. No.: 10/536,673

(22) PCT Filed: Dec. 3, 2003

(86) PCT No.: PCT/GB03/05299

§ 371 (c)(1),
(2), (4) Date: May 27, 2005

(87) PCT Pub. No.: WO2004/051968

PCT Pub. Date: Jun. 17, 2004

(65) Prior Publication Data

US 2006/0094479 A1    May 4, 2006

(30) Foreign Application Priority Data

Dec. 4, 2002 (GB) .................................. 0228328.1

(51) Int. Cl.
*H04B 1/08* (2006.01)

(52) U.S. Cl. ................... 455/347; 455/575.1; 455/348; 379/433.11; 379/433.12

(58) Field of Classification Search .................. 455/95, 455/550.1, 575.1, 90.3, 344, 346, 347, 348, 455/349, 100, 424, 425, 456.5, 456.6, 561, 455/557, 556.2, 556.1; 379/428.01, 428.04, 379/433.1, 433.11, 434; 206/216, 581, 823, 206/235; 132/297, 294, 295, 293, 301

See application file for complete search history.

(56) References Cited

U.S. PATENT DOCUMENTS

| 5,745,566 | A | 4/1998 | Petrella | |
|---|---|---|---|---|
| 6,311,077 | B1 | 10/2001 | Bien | |
| 6,363,947 | B1* | 4/2002 | Wu | 132/297 |
| 6,397,078 | B1* | 5/2002 | Kim | 455/556.2 |
| 6,796,431 | B1* | 9/2004 | Goldring | 206/581 |
| 2002/0137537 | A1 | 9/2002 | Watanabe | |
| 2003/0000865 | A1* | 1/2003 | Carlino | 206/581 |
| 2006/0042971 | A1* | 3/2006 | Holmes et al. | 206/235 |

FOREIGN PATENT DOCUMENTS

| DE | 299 11 105 | | 3/2000 |
|---|---|---|---|
| DE | 299 11 106 U1 | | 6/2000 |
| DE | 101 03 274 A1 | | 8/2001 |
| JP | 07321892 | | 12/1995 |
| JP | 2001-119159 | * | 4/2001 |
| WO | WO 0135790 | | 5/2001 |

* cited by examiner

*Primary Examiner*—Edward F. Urban
*Assistant Examiner*—Charles Chow
(74) *Attorney, Agent, or Firm*—Dann, Dorfman, Herrell and Skillman, P.C.; Henry H. Skillman

(57) ABSTRACT

A portable personal communications and cosmetics apparatus (1) comprising a base unit (2) having side walls with cavities (17*a-f*) therein for receiving removable cosmetics products (18*a-f*) and a mobile phone unit (3) mounted, e.g. removably, on the base unit (2).

11 Claims, 6 Drawing Sheets

FIG. 1
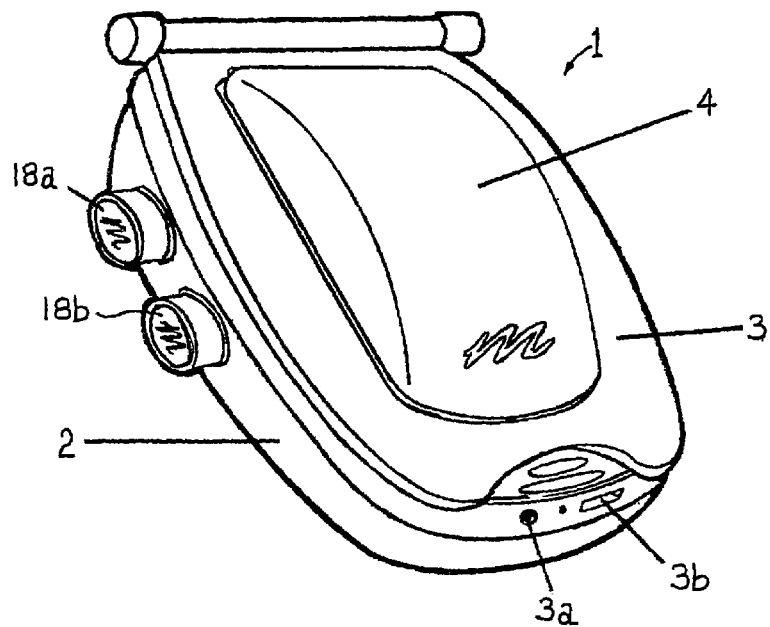
FIG. 2
FIG. 3
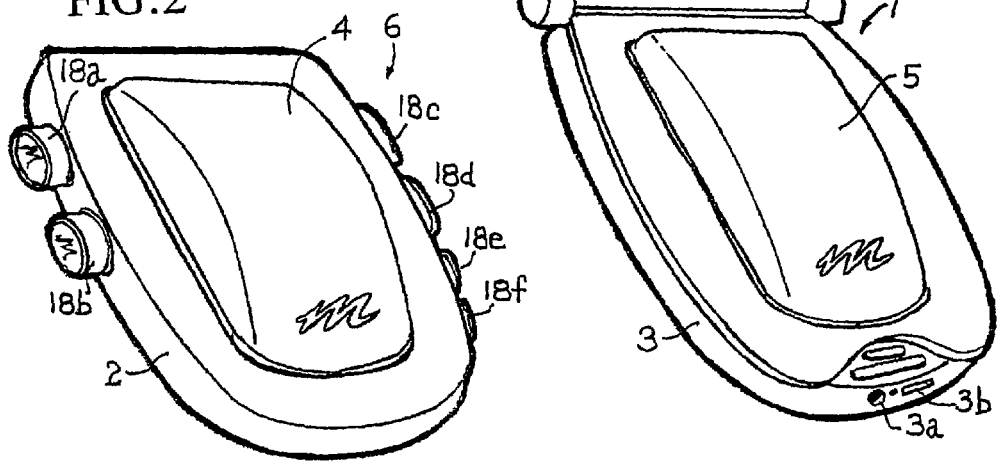

PERSONAL COMMUNICATIONS AND COSMETICS APPARATUS

This invention relates to a portable personal communications and cosmetics apparatus.

A known combined cosmetics compact and mobile phone is disclosed in U.S. Pat. No. 6,311,077. This known apparatus comprises a main housing for the mobile phone incorporating a keypad and one or more receptacles for storing cosmetics and a flip top lid pivoted to the main housing and including an electrochromic mirror. On opening the flip top lid, the keypad and cosmetics are available to be used and the mirror is operable between a display mode when the mobile phone is being used and a mirror mode when the cosmetics compact is being used.

In U.S. Pat. No. 6,796,431 there is described a cosmetics package capable of carrying a plurality of different cosmetics products.

The present invention relates to an improved portable personal communications and cosmetics apparatus which is able to carry a plurality of different cosmetics.

According to one aspect of the present invention there is provided a portable personal communications and cosmetics apparatus comprising a base unit having side walls with cavities therein for receiving removable cosmetics products and a mobile phone unit mounted on the base unit. Thus in a single apparatus, the mobile phone unit and base unit may be used independently or together for their separate functions.

Conveniently the mobile phone unit is detachably mounted on the base unit. In this case the mobile phone unit and the base unit may be detached and used separately.

Suitably the apparatus further comprises a top unit for carrying further cosmetics products. In the case where the mobile phone unit is detachably mounted on the base unit, the top unit may be detachably mountable an either the base unit or the mobile phone unit. Thus typically, if the mobile phone unit is mounted on the base unit, the top unit could be attached to the mobile phone unit to increase the number of cosmetics products carried. Similarly if the mobile phone unit is detached from the base unit, the top unit could be attached to the base unit to provide an enhanced cosmetics carrying device. In the case where the mobile phone unit is detachably mounted on the base unit and the top unit is detachably mountable on either one of the base unit and the mobile phone unit, a fascia device may be detachably mounted on the mobile phone unit when the latter is detached from the base unit and the top unit is attached to the base unit.

According to another aspect of the present invention there is provided a portable personal communications and cosmetics apparatus comprising a cosmetics unit with cavities therein for receiving removable cosmetics products and a mobile phone unit detachably mounted on the cosmetics unit.

According to a still further aspect of the present invention there is provided a portable personal communications and cosmetics apparatus comprising a base unit, a cosmetics carrier for cosmetics products carried by the base unit and movable relative thereto between an open position for accessing the cosmetics products and a closed position, and a mobile phone unit mounted on the base unit. Suitably the cosmetics carrier comprises a tray slidable in the base unit between its open and closed positions.

Embodiments of the invention will now be described, by way of example only, with particular reference to the accompanying drawings, in which:

FIG. 1 is a perspective view of one embodiment of a portable personal communications and cosmetics apparatus according to the invention and comprising a base unit, a mobile phone unit and a top unit;

FIG. 2 is a perspective view of the apparatus shown in FIG. 1 but without the mobile phone unit and with the top unit mounted on the base unit;

FIG. 3 is a perspective view of the mobile phone unit of FIG. 1 but with a fascia unit mounted thereon;

Figure 4:
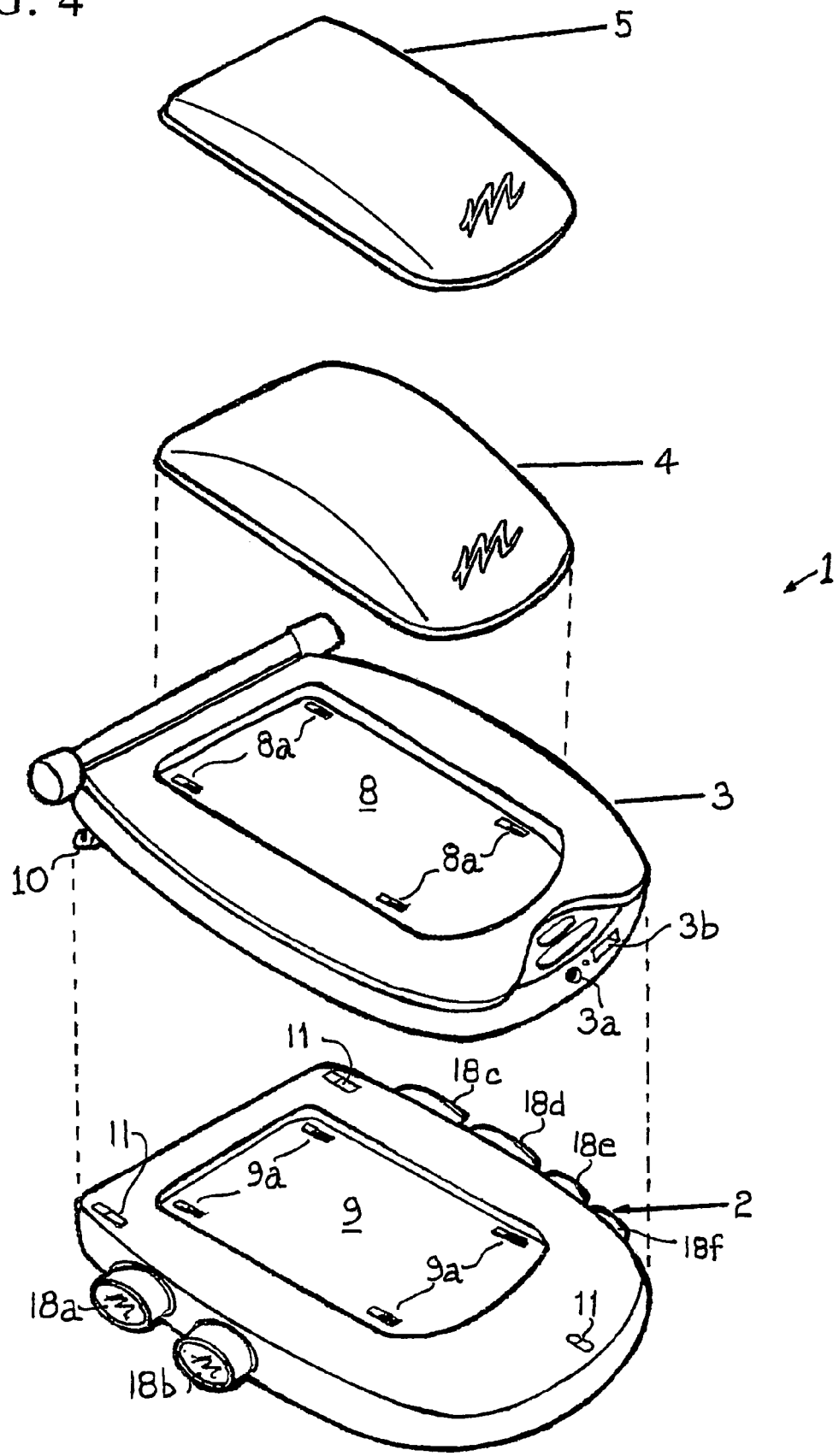
FIG. 4 is an exploded view of the various parts of the apparatus shown in FIGS. 1 to 3.
Figure 5:
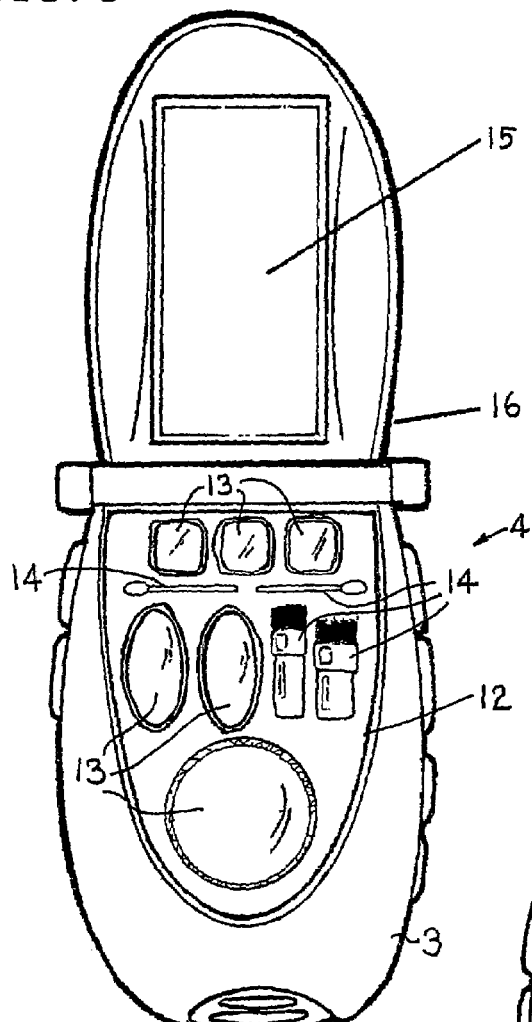
FIG. 5 is a view from above of the apparatus shown in FIG. 1 with the top unit having its cover hinged open.

FIGS. 1-7 illustrate various aspects of one embodiment of a portable personal communications and cosmetics apparatus generally designated by the reference numeral 1. As can be seen most clearly in FIG. 4, the apparatus 1 comprises four components, namely a base unit 2, a mobile phone unit 3 (e.g. a cellular radiotelephone unit), a top unit 4 and a fascia unit 5. The phone unit 3 has sockets, such as a socket 3a to enable the connection thereto of an earpiece and/or microphone and a charger socket 3b, all of which are known per se.

Each of the units 2-5 is designed so as to be detachably connectible to at least one other of the units 2-5 to enable the construction of the combined apparatus 1 (shown in FIGS. 1 and 5) or a separate cosmetics compact 6 (see FIG. 2) and a separate mobile phone 7 (see FIG. 3).

As can be seen in FIG. 4, the phone unit 3 has a recess 8 formed in its upper surface and the base unit 2 has a similarly shaped recess 9 in its upper surface. The recess 8 is designed to detachably receive either the top unit 4, to create the apparatus 1 shown in FIG. 1 when the phone unit 3 is detachably attached to the base unit 2, or the fascia unit 5 to create the mobile phone 7 shown in FIG. 3 when the phone unit is detached from the base unit 2. The fascia unit 5 when attached to the phone unit 3 is designed to improve the aesthetic appearance of the mobile phone 7.

The means for attaching/detaching the units may comprise any suitable means. In FIG. 4 the recesses 8 and 9 have spaced apart openings 8a and spaced apart openings 9a, respectively, formed therein for receiving, e.g. in a snap-fit, similarly spaced apart lugs (not shown) formed in the underside of the units 4 and 5. The phone unit 3 is provided with spaced apart lugs 10 (one of which can be seen in FIG. 4) which are received, for example in a snap-fit, in similarly spaced apart openings 11 in the base unit 2.

The phone unit 3 has a base 3c and a lid 3d hinged thereto. On opening the lid 3d, a keypad 3e and speaker 3f are exposed. On the lid 3d there is a speaker 3g and visual display 3h. All these features are known in conventional mobile phones.

The top unit 4 comprises a base 12 (see FIG. 5 in which the unit 4 is mounted on the phone unit 3) with a lid 16 hinged thereto. The base 12 has a plurality of recessed portions in which are removably received cosmetics products, for example in the form of caked (or pressed) powdered products 13, such as eyeshadows, highlighters, concealers, blushers and/or face powder, and applicators 14, e.g. brushes. The lid 16 has a mirror 15 on its inside surface. Although not shown in the drawings, the base 12 and lid 16 are provided with releasable retaining means for holding the lid in the closed position (shown in FIGS. 1,2 and 4).

Figure 6:
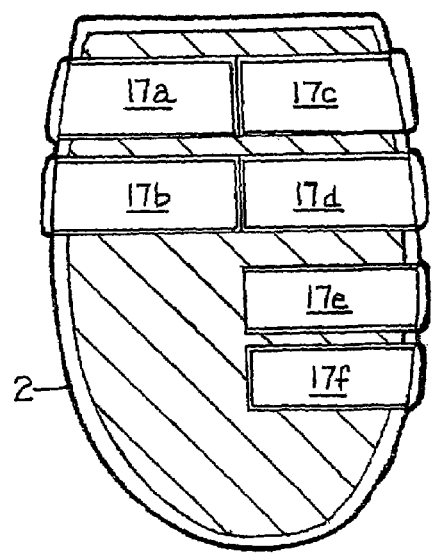
FIG. 6 is a sectional view of the base unit of the apparatus shown in FIGS. 1, 2 and 4.
Figure 7:
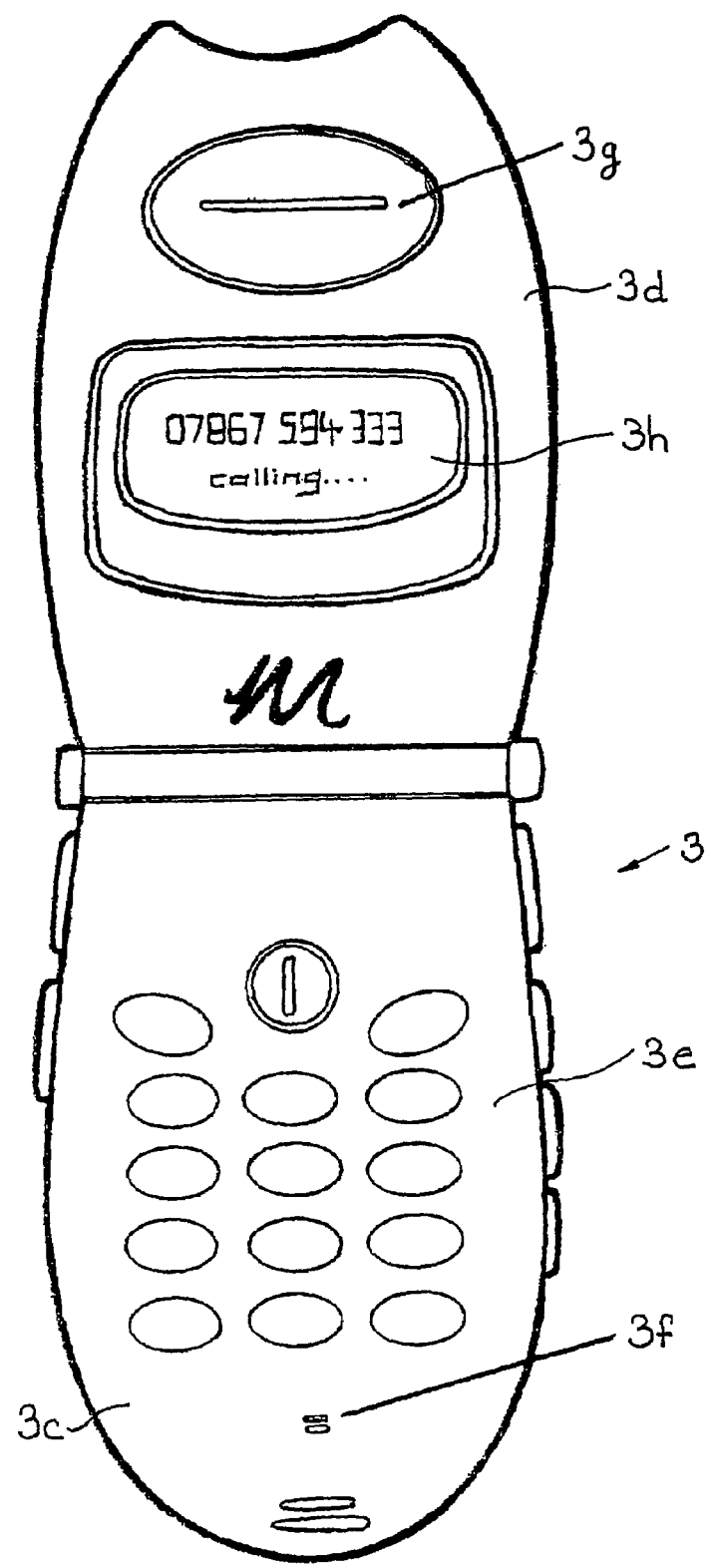
FIG. 7 is a view from above of the mobile phone unit of the apparatus shown in FIG. 1 with its lid open.
Figure 8:
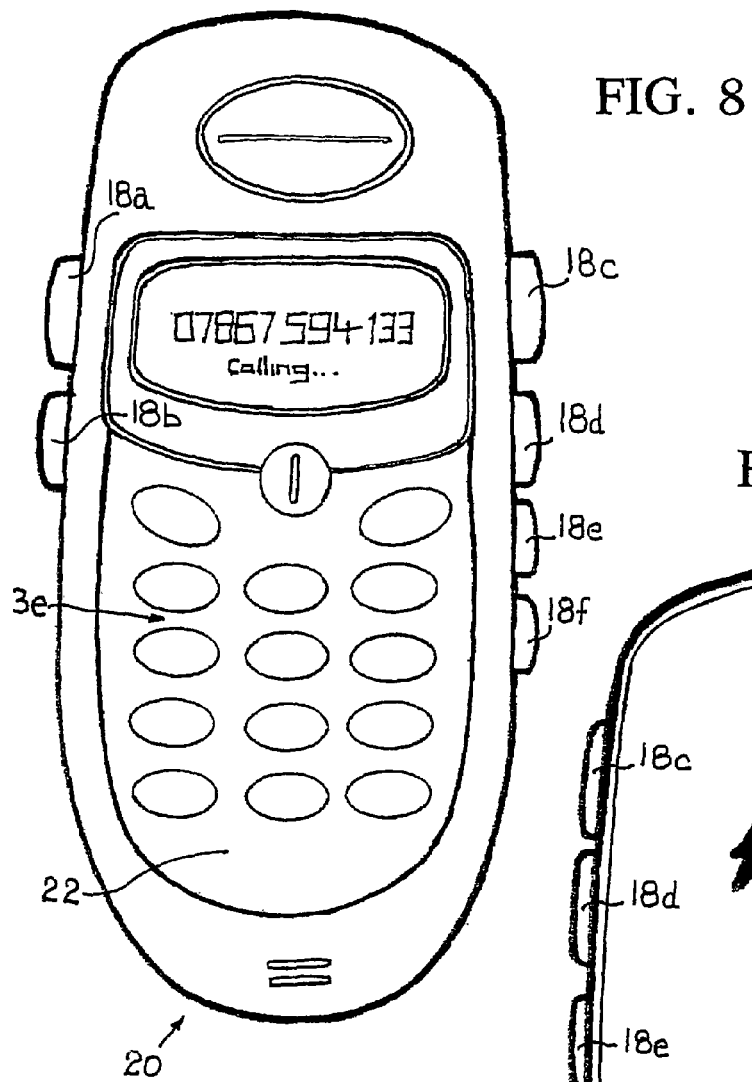
FIGS. 8, 9 and 10 are views from above, below and one side, respectively, of another embodiment of a portable personal communications and cosmetics apparatus according to the invention incorporating a slidable cosmetics carrier shown, in these views, in a closed position.
Figure 9:
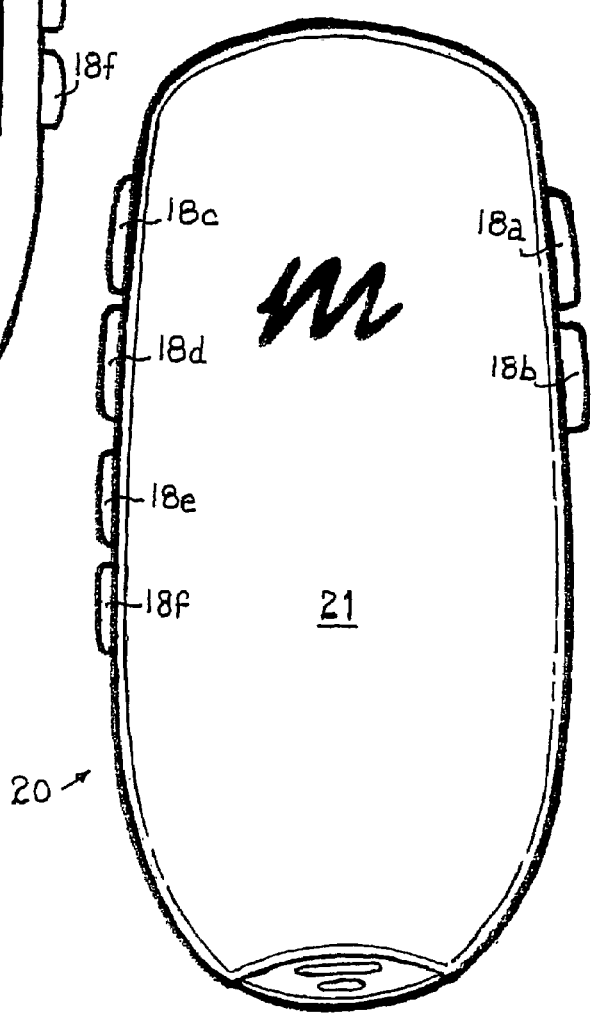
Figure 11:
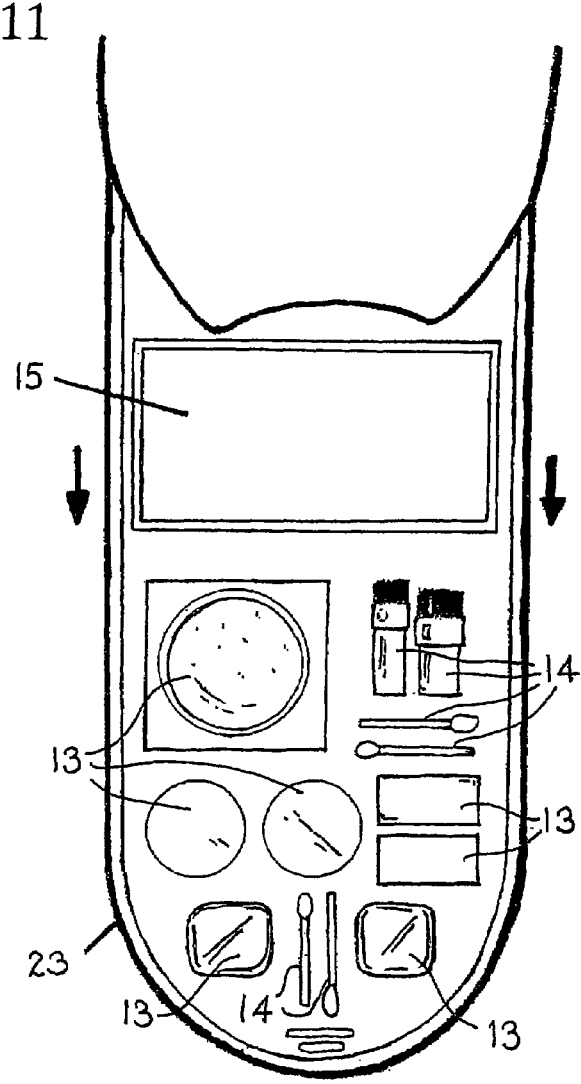
FIG. 11 is a view form below of the apparatus shown in FIGS. 8-10 with the slidable cosmetics carrier in an open position.
Figure 10:
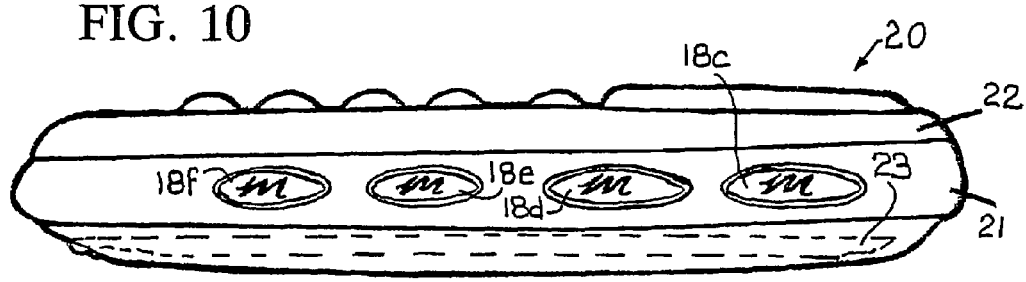

The base unit 2, and in particular cosmetics product receiving cavities 17a-17f, are shown in more detail in FIG. 6. Conveniently the mouths of the cavities 17a-f are screw-threaded and receive similarly screw-threaded cosmetics products 18a-f (see FIGS. 1,2 and 4).

In U.S. Pat. No. 6,796,431 there is described a cosmetics container consisting of a base unit and a lid hinged thereto. The base unit of the cosmetics container has side walls with cavities therein for receiving cosmetics products which can be removably stored in the cavities. The upper part of the base unit has a plurality of further cosmetics products, such as cakes of powdered material, e.g. eyeshadows, highlighters, concealers, blushers and/or face powder, and applicators, e.g. brushes, which are closed to access when the lid is closed. The cosmetics compact 6 shown in FIG. 2 of the present application, created by mounting the top unit 4 on the base unit 2, is similar in many respects to the cosmetics container shown in U.S. Pat. No. 6,796,431 (the entire contents of which are incorporated herein by way of reference) although, of course, in U.S. Pat. No. 6,796,431 the base unit is a single unit and is not formed of detachable units 2 and 4. The preferred method of releasably retaining the cosmetics products 18a-f in the cavities 17a-f is the same as that described in U.S. Pat. No. 6,796,431 and will not be described in detail herein. However other retention means may be employed if desired.

FIGS. 8-11 illustrate various aspects of another embodiment of a portable personal communications and cosmetics apparatus generally designated by the reference numeral 20. The apparatus 20 is similar in many respects to the apparatus 1 and, where appropriate, the same reference numerals have been used to identify similar parts of the two apparatuses.

The apparatus 20 comprises a mobile phone with a housing having means to carry a plurality of cosmetics products 13, 14 and 18a-f and can be considered as comprising a base unit 21 on which a phone unit 22 is non-detachably mounted. It will be appreciated that the units 21 and 22 may form an integral base or housing or may be separate parts non-detachably joined together. In either case, the phone unit 22 can be considered as being mounted on the base unit 21.

The base unit 21 has cavities (not shown but similar to the cavities 17a-f of apparatus 1) in its side walls for removably receiving the cosmetics products 18a-f. The cosmetics products 13, 14 are carried on a carrier 23 in the form of a tray which is slidably received in an opening in the base unit 21 for movement between an open position (see FIG. 11) and a closed position (see FIGS. 8-10). The carrier also carries a mirror 15 which is exposed for viewing when the carrier is in its open position.

The two embodiments of apparatus described herein enable a user to use the mobile phone and cosmetics compact together—i.e. to use the mobile phone whilst applying make-up. In the first embodiment the cosmetics compact and mobile phone can be detached and used separately.

The "cosmetics" aspects of the apparatuses described herein are able to hold small quantities of virtually every cosmetic a woman needs in order to make herself up. The invention therefore provides means for keeping together all the necessary cosmetics that a user requires whilst in addition providing the facility to enable the user to use a mobile telephone. Because of the way in which the cosmetics products fit securely into the various cavities or are received in easily accessible means, a user, when making-up her face, is able to select, use and put back in the correct position each cosmetics product as and when required. In addition the user can use the cosmetics products whilst talking on the mobile phone, especially when an external earpiece and microphone are connected to the phone.

The combined cosmetics/mobile phone apparatus described herein puts together all the cosmetics products that a woman needs to make-up and a mobile phone in a single convenient, cosmetics container which is small enough to go into a handbag. The cosmetics products are intended to be replaceable so that users will be able to purchase the empty apparatus separately and choose the "colour cassettes" which they require. When the cosmetics are used up, or if the user just requires a new shade of cosmetics product, she buys a new cassette, takes out the old one and replaces it with the new one. To allow the container to carry sufficient cosmetics products, it is intended that the amount of cosmetic in each "colour cassette" should be less than the normal full size sold and will be shaped to fit into the slim base unit of the apparatus. None of the cosmetics products carried by the apparatuses has removable caps which need to be temporarily stored when the product in question is being used. Thus the cavities 17a-f themselves provide the "caps" or lids for the products 18a-f, respectively.

The main advantages to women of the apparatuses described herein are:

1) The combination of a portable mobile phone and a plurality of cosmetics products in a convenient holder.

2) The apparatus according to the invention eliminates the use of a conventional make-up bag allowing cosmetics products to be stored in precise positions within a single cosmetics container.

3) Because the cosmetics products are secured in the base unit and/or top unit by secure mechanisms, e.g. screw-threads and closable lids, they are secure in transit.

4) A user can hold the apparatus in one hand and, with the other hand, remove and immediately use any stored cosmetics product without the need to remove a removable cap or lid from the removed cosmetics product and temporarily store it. At least some of the cosmetics products have exposed, uncapped "sticks" of cosmetics material. The walls of cavities in which these cosmetics products are stored themselves provide "caps" or "tops" for the products. On removal of such a cosmetics product from its cavity the exposed end of the stick of cosmetics material can be applied directly to the face of a user. It is noted that the base unit 2 has laterally-opposed right and left side walls. Some of the cavities 17a-f are positioned in the right side wall of the base and the remaining cavities in the left side wall of the base, so that the user may store the most-used "sticks" in the side wall of the base 2 which is most readily accessible to the dominant hand of the user which is free when the other hand is holding the phone unit 3 or the base 2. In like manner the base unit 21 has cavities for receiving the cosmetic products 18a-f distributed between the laterally-opposed side walls of the base 21. As in the first embodiment, the user may select the "stick" which she desires to be readily accessible to her dominant free hand when the other hand is holding the phone unit 22 which may or may not be attached to the base unit 21. It should be noted that in both embodiments, two of the cavities in the right wall are identical to the two cavities in the left wall to permit the user to select between the opposite walls for stowage of the accessible "stick". The identical cavities have internal configurations providing a secure fit and a secure closure for the same cosmetic product case.

The invention claimed is:

1. A portable personal communications and cosmetics apparatus comprising a base unit having two laterally opposed side walls, each with a plurality of cavities therein for receiving at least two removable cases of cosmetics products and a separate mobile phone unit mounted on the base unit, two of said cavities in one of said laterally opposed side walls being identical to two of said cavities in the opposite laterally opposed side wall, said identical cavities having internal configurations providing a secure fit and a secure closure for the same cosmetic product case.

2. An apparatus according to claim 1, in which said mobile phone unit is detachably mounted on the base unit.

3. An apparatus according to claim 2, further comprising a top unit for carrying further cosmetics products.

4. An apparatus according to claim 3, in which the top unit is detachably mountable on either the base unit or the mobile phone unit.

5. An apparatus according to claim 2, including a fascia device detachably mountable on the mobile phone unit when the latter is detached from the base unit.

6. An apparatus according to claim 1 further comprising a top unit for carrying further cosmetics products.

7. A portable personal communications and cosmetics apparatus according to claim 1 wherein said base unit side walls have a given depth, said base unit having a width greater than the width of said mobile phone unit, a length greater than the length of said mobile phone unit, and a tray for receiving the cosmetics products slidably mounted in said base, said tray having a depth less than said given depth, said cavities slidably receiving said tray, and said identical cavities adapted to receive the same case of an individual cosmetic product.

8. A portable personal communications and cosmetics apparatus according to claim 1, including selected cosmetic products having screw-threaded packages, selected ones of said cavities being screw-threaded complementary to said screw-threaded packages.

9. A portable personal communications and cosmetics apparatus comprising a base unit, a cosmetics carrier for cosmetics products comprising a tray slidable in the base unit carried by the base unit and movable relative thereto between an open position for accessing the cosmetics products and a closed position, and a separate mobile phone unit mounted on the base unit, said base unit having two laterally opposed side walls, each with a plurality of cavities therein for receiving further removable cases of cosmetic products, at least one of said cavities in one of said laterally opposed side walls being identical to at least one of said cavities in the opposite laterally opposed side wall, said identical cavities having identical internal configurations providing a secure fit and a secure closure for the same cosmetic product case.

10. A portable personal communications and cosmetics apparatus comprising a case, and a separate mobile phone unit non-detachably mounted in said case, said case having a back coextensive in length and width with said unit, said apparatus having a recess separating the phone unit from the back of the case, and a cosmetics carrier for cosmetics products comprising a tray slidable in the hollow recess of the case and movable relative thereto between an open position for accessing the cosmetics products and a closed position, said case having two laterally opposed side walls, each with a plurality of cavities therein for receiving further removable cosmetic products, at least one of said cavities in each wall being identical to one of the cavities in the opposite wall, said identical cavities having internal configurations providing a secure fit and a secure closure for the same cosmetic product case.

11. A portable personal communications and cosmetics apparatus according to claim 10, including a plurality of cavities in said case, and selected cosmetic products having screw-threaded packages, selected ones of said cavities being screw-threaded complementary to said screw-threaded packages.

* * * * *